US000002001B1

(19) United States

(12) Statutory Invention Registration

Pinkus

(10) Reg. No.: US H2001 H

(43) Published: Nov. 6, 2001

(54) VEHICULAR DECELERATION-RESPONSIVE CENTER HIGH-MOUNTED STOPLIGHT

(75) Inventor: Alan R. Pinkus, Bellbrooke, OH (US)

(73) Assignee: The United States of America as represented by the Secretary of the Air Force, Washington, DC (US)

(21) Appl. No.: 09/100,786

(22) Filed: Jun. 10, 1998

(51) Int. Cl.[7] ..... B60Q 1/44

(52) U.S. Cl. ..... 340/479; 340/467; 340/469; 340/463; 340/464

(58) Field of Search ..... 340/479, 467, 340/463, 469, 471, 472

(56) References Cited

U.S. PATENT DOCUMENTS

| | | | | |
|---|---|---|---|---|
| 4,600,913 | | 7/1986 | Caine . | |
| 4,983,953 | * | 1/1991 | Page | 340/467 |
| 5,001,609 | | 3/1991 | Gardner et al. . | |
| 5,017,904 | * | 5/1991 | Browne et al. | 340/479 |
| 5,089,805 | * | 2/1992 | Salsman | 340/467 |
| 5,150,098 | | 9/1992 | Rakow . | |
| 5,231,373 | * | 7/1993 | Freeman et al. | 340/469 |
| 5,309,141 | | 5/1994 | Mason et al. . | |
| 5,345,218 | | 9/1994 | Woods et al. . | |
| 5,347,435 | | 9/1994 | Smith et al. . | |
| 5,594,416 | * | 1/1997 | Gerhaher | 340/467 |
| 5,682,137 | * | 10/1997 | Li | 340/467 |
| 5,801,624 | * | 9/1998 | Tilly et al. | 340/479 |

* cited by examiner

*Primary Examiner*—Harold J. Tudor

(74) *Attorney, Agent, or Firm*—Gerald B. Hollins; Thomas L. Kundert

(57) ABSTRACT

An improved center high-mounted stoplight apparatus for a motor vehicle or other transportation apparatus. The apparatus includes a pulsating or flashing mode of operation used to indicate rapid deceleration of the vehicle. This pulsating or flashing mode is in addition to the regular continuous mode of operation used for normal braking and deceleration and is arranged to be of a maximal human visibility and attention-capturing operating cycle. A plurality of different signaling arrangements to a following vehicle including an incandescent lamp, a gas tube lamp, light-emitting diode devices and non light-based signaling are also contemplated. Additionally included is a maximal distance spanning attention-capturing operating mode entered into in response to, for example, a collision-related deceleration event and maintained over a prolonged operating time or until manually disabled.

18 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

VEHICULAR DECELERATION-RESPONSIVE CENTER HIGH-MOUNTED STOPLIGHT

RIGHTS OF THE GOVERNMENT

The invention described herein may be manufactured and used by or for the Government of the United States for all governmental purposes without the payment of any royalty.

BACKGROUND OF THE INVENTION

This invention relates to communication of vehicular deceleration information to following vehicles, especially in automotive vehicles having the U.S. Federal Government-mandated "center high-mounted stoplight" system.

Following a series of tests in which the benefits of additional signaling to the driver of a trailing motor vehicle were illustrated in a convincing manner the U.S. Government, since the mid 1980's, has mandated the incorporation of high-mounted braking indication signals at the rear of newly manufactured motor vehicles. This new signal which is often mounted at eye level in a laterally centered lower or upper portion of the vehicle rear window has become known in the art as a "center high-mounted stoplight" system. References to the system by a name of this nature, in fact, appear in government vehicle specifications. Earlier versions of this system used one or more incandescent filament lamps (within a module carried inside the vehicle on the rear shelf for example) as a source of signal illumination. Later appearing versions have included an array of physically dispersed incandescent filament or light-emitting diode devices disposed outside the vehicle and spread over significant rear facing dimensions of the vehicle. In either instance the signaling device is required to meet detailed standards regarding viewing angle and other details.

One of the origins of apparatus of this type is found in a study accomplished over ten years ago, a study in which an additional brake light was placed high and centered on 2100 taxicabs in Washington, D.C. (see Malone, 1986, one of the reference publications identified subsequently herein). During this study it was found that the number of rear-end collisions with these taxicabs was significantly ($p=0.001$) reduced—by 54%. The results were so compelling that all cars since September 1985 now incorporate this feature. Rear-end accidents account for about 37% of all multi-vehicle accidents (McKnight reference, 1992). The present invention further enhances this proven system by flashing the center high-mounted rear stoplight when the vehicle is undergoing an abrupt, relatively high-g deceleration or stop.

Another origin for systems of the present type lies in the fact that flashing lights are known to have better visual attention-getting attributes than steady state lights. Emergency vehicles use flashing lights to increase conspicuity and to warn of potentially dangerous situations for this reason. This is also why aircraft anti-collision lights (both on aircraft and on high towers or buildings) are flashed. Inherently, some drivers manually turn on their emergency flashers to provide short and long-range warning to oncoming traffic of traffic slow down in recognition of this visibility improvement. The system of the present invention will serve to automatically warn drivers behind rapidly decelerating vehicles to take precautionary measures. If ultimately used in large numbers of vehicles on the road, a system of this type will provide a universally recognizable indication of rapid vehicle decelerations and the need for following driver alertness to unforeseen traffic conditions.

The U.S. Government owns, maintains and uses large numbers of motor vehicles. The present invention stoplight enhancement system will likely reduce the number of rear-end collisions occurring with these vehicles thereby saving lives, money and government property. Universal use of the invention by cars, vans and small trucks is believed to offer the potential for increased overall traffic safety on national (or even international) highways.

SUMMARY OF THE INVENTION

The invention provides high deceleration-related information in a manner selected for maximum attention capturing visual engagement of a following vehicle driver or a distant approaching driver.

Most late model motor vehicles incorporate an additional red stoplight that is centered and usually positioned higher (near eye-level) than the conventional left and right stoplights, the low-mounted stoplights which often also serve as turn signal indicating lamps. The addition of this centered, high-mounted stoplight has been proven to significantly reduce rear-end collisions. The present invention provides additional vehicular safety by increasing the conspicuity of such a rear stoplight system. According to the invention a transducer device that is sensitive to abnormal stopping conditions (e.g., when a car decelerates suddenly or when an automatic brake system, i.e., an antilock brake system (ABS), is activated on slippery pavement) is used to flash the centered stoplight—and only the centered stoplight. The flashing of this stoplight increases its attention-getting attributes. This flashing signal will further serve as an indication to the drivers to the rear that traffic is decelerating faster than normal and that increased awareness or precautionary measures should be initiated.

It is an object of the present invention, therefore, to provide an abnormal rate of vehicle deceleration-controlled visual signal to a following vehicle driver.

It is another object of the invention to provide flashing signal indications of rapid vehicle deceleration to following vehicles through use of existing center high-mounted stoplight apparatus.

It is another object of the invention to provide flashing signal indications of rapid vehicle deceleration to following vehicles through use of existing center high-mounted stoplight apparatus operated in a differing and additional operating mode.

It is another object of the invention to provide flashing signal indications of rapid vehicle deceleration in addition to conventional continuous signal indications of braking in a motor vehicle.

It is another object of the invention to provide longer term flashing signal indications of stopped vehicle conditions following the extremely rapid vehicle deceleration which may occur, for example, in a vehicle collision event.

It is another object of the invention to provide flashing signal indications of rapid vehicle deceleration by way of one of a plurality of different signaling elements.

Additional objects and features of the invention will be understood from the following description and claims and the accompanying drawings.

These and other objects of the invention are achieved by motor vehicle high-mounted visual signaling apparatus comprising the combination of:

- a first vehicle-received high-mounted electrically responsive visual signaling device disposed at subatantially eye level of an operator's position of a second trailing vehicle;
- means for continuously energizing said first vehicle high-mounted electrically responsive visual signaling device from a first vehicle energy source in response to normal deceleration g-force braking of said first vehicle; and means for intermittently energizing said first vehicle high-mounted electrically responsive signaling device from said first vehicle energy source in response to abnormal higher deceleration g-force braking of said first vehicle.

DETAILED DESCRIPTION

Figure 1:
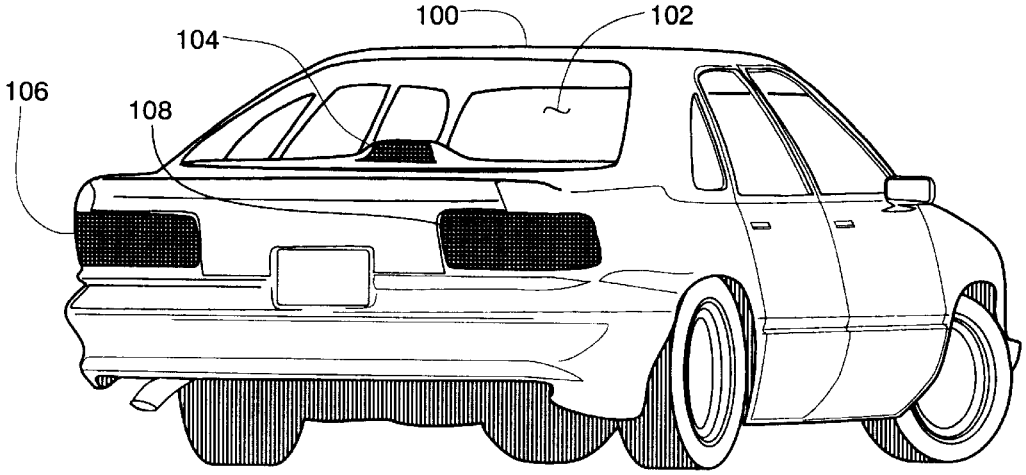
FIG. 1 shows a typical center high-mounted stoplight physical arrangement according to the invention for an automobile.
Figure 2:
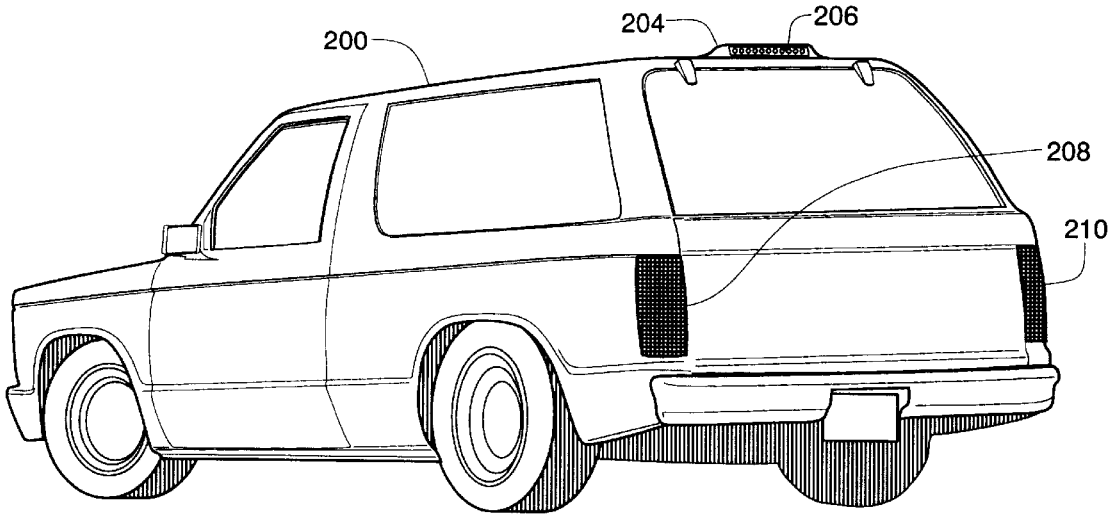
FIG. 2 shows a typical center high-mounted stoplight physical arrangement for a small truck or sport utility vehicle.

FIG. 1 and FIG. 2 in the drawings show two popular arrangements for providing the center high-mounted stoplight feature on motor vehicles of current vintage. In the FIG. 1 drawing a sedan vehicle 100 is viewed from behind in the manner appearing to the eyes of a following driver. Disposed in the lower center part of the rear window 102 of the sedan 100 is a center high-mounted stoplight 104 of the vehicle interior-mounted type. The center high-mounted stoplight 104 preferably includes a light tight enclosure and a resilient member sealing this enclosure against the glass of the rear window 102 in order to prevent driver disturbing light radiation into the vehicle during nighttime operation. Within this enclosure is mounted one or more incandescent filament lamps providing rearward directed illumination for signaling the application of vehicle brakes to following vehicle drivers. A red filter or lens is usually employed to exclude most lamp output spectral regions excepting for the expected red colored emission.

In the FIG. 2 drawing a more modern version of the center high-mounted stoplight is shown at 204 to be mounted on an upper exterior surface of a small van or sport utility vehicle 200. In the FIG. 2 center high-mounted stoplight arrangement, a plurality of individual light-emitting elements 206 which may be of the incandescent filament or of the light-emitting diode type are shown to be received in a low profile housing and directed toward the eyes of a following vehicle driver. A lens assembly covering and obscuring individual light-emitting diode elements may or may not be present in the FIG. 2 center high-mounted stoplight arrangement. According to present day practices each of the FIG. 1 and FIG. 2 center high-mounted stoplight devices is electrically energized from the vehicle electrical system upon application of the vehicle service brakes and for the duration of this braking. Usually, however, the FIG. 1 and FIG. 2 center high-mounted stoplight devices are not involved in any turn-signal or emergency flasher signaling events involving the vehicles 100 and 200—such signaling being relegated to the conventional low mounted left and right tail lamps indicated at 106 and 108 in FIG. 1 and at 208 and 210 in FIG. 2.

Figure 3:
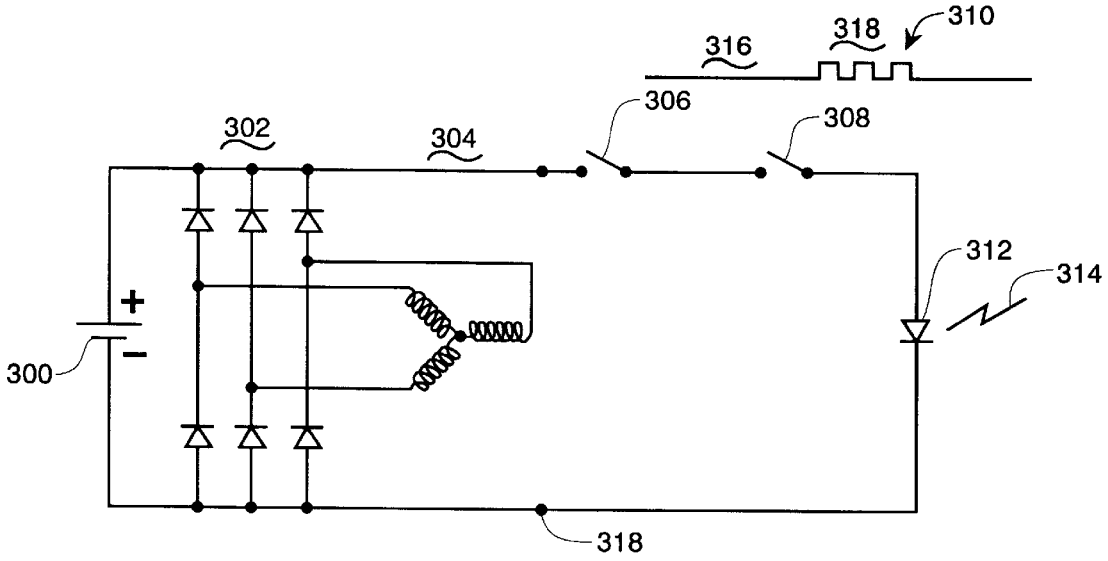
FIG. 3 shows a simplified electrical schematic diagram for operating a FIG. 1 or FIG. 2 center high-mounted stoplight system according to the present invention.

FIG. 3 in the drawings shows a simplified electrical schematic diagram of an electrical circuit which may be used to energize the center high-mounted stoplight elements shown at 104 and 204 in FIG. 1 and FIG. 2 while also incorporating the flashing of these elements according to the present invention. In the FIG. 3 drawing an electrical battery 300 which may be of the common twelve volt vehicle starting type is shown connected to an alternator 304 and its rectifier array 302 to provide a continuous supply of direct current electrical energy at the nodes 316 and 318. In addition to the other vehicle load devices, which are not shown in FIG. 3, there is connected to these nodes an electrical circuit which includes the normal vehicle brake signal switch 306, the added switch element 308 and a representative light-emitting diode device 312. The light-emitting diode device 312 provides a visible light output 314 which preferably includes a significant spectral component located in the red portion of the visible spectrum in order to serve as a vehicle brake warning signal light.

In the FIG. 3 schematic diagram the switch 306 may be operated in the conventional closed upon brake application manner by way of being a brake system hydraulic pressure responsive switch, by way of being mechanically operated by, for example, brake pedal movement or by being responsive to deceleration forces above a selected amplitude in the vehicle. In any of these or other possible switch operating modes, closure of the switch 306 to indicate vehicle deceleration is contemplated. As indicated by the associated waveform 310 the switch 308 is provided with two operating modes in the FIG. 3 system. In the first of these modes, as shown at 316 in the waveform 310, the switch 308 remains continuously closed and operation of the light-emitting diode 312 is just as if the switch 306 were not present in the circuit, i.e., was replaced with a jumper. In its second operating mode, as shown at 318 in the waveform 310, the switch 308 operates in a pulsating or flashing mode in which it operates, for example, at a rate of some one to two cycles per second or 1–2 Hertz.

Changeover of the switch 308 from its first or continuous mode of operation 316 to the second or pulsating or flashing mode of operation 318 is contemplated to occur in response to sensing of a rate of vehicle deceleration of some greater than normal magnitude, a magnitude indicating vehicle panic braking or tire skidding for example. This changeover may be initiated, for example, by an electronic circuit which receives an accelerometer derived vehicle g-force indicating signal and amplifies this signal to the point of driving a semiconductor switching device embodying the switch 308 for example. This changeover may also be achievable in electromechanical form through use of an initially mechanically restrained vibrating spring and weight element connected to a switch as was often used in telephony equipment some years ago. With either the electronic or the electromechanical realization of the switch 308, the pulsating waveform indicated at 318 together with the presumed closure of the braking actuated switch 306 results in the herein desired pulsating or flashing or modulated operation of the light-emitting diode element 312.

Other arrangements of the FIG. 3 simplified electrical schematic diagram are clearly possible and will doubtless occur to persons skilled in the electrical art; the use of a continuously pulsating switch that is shunted by a deceleration responsive third switch is, for example, one alternate arrangement of the FIG. 3 apparatus. A more comprehensive hardware based alternate arrangement for operating switches of both the 306 and 308 type in FIG. 3 is also shown in block diagram form in the FIG. 4 drawing. A computer based alternate arrangement of the FIG. 3 apparatus is also shown in the FIG. 5 drawing.

Figure 4:
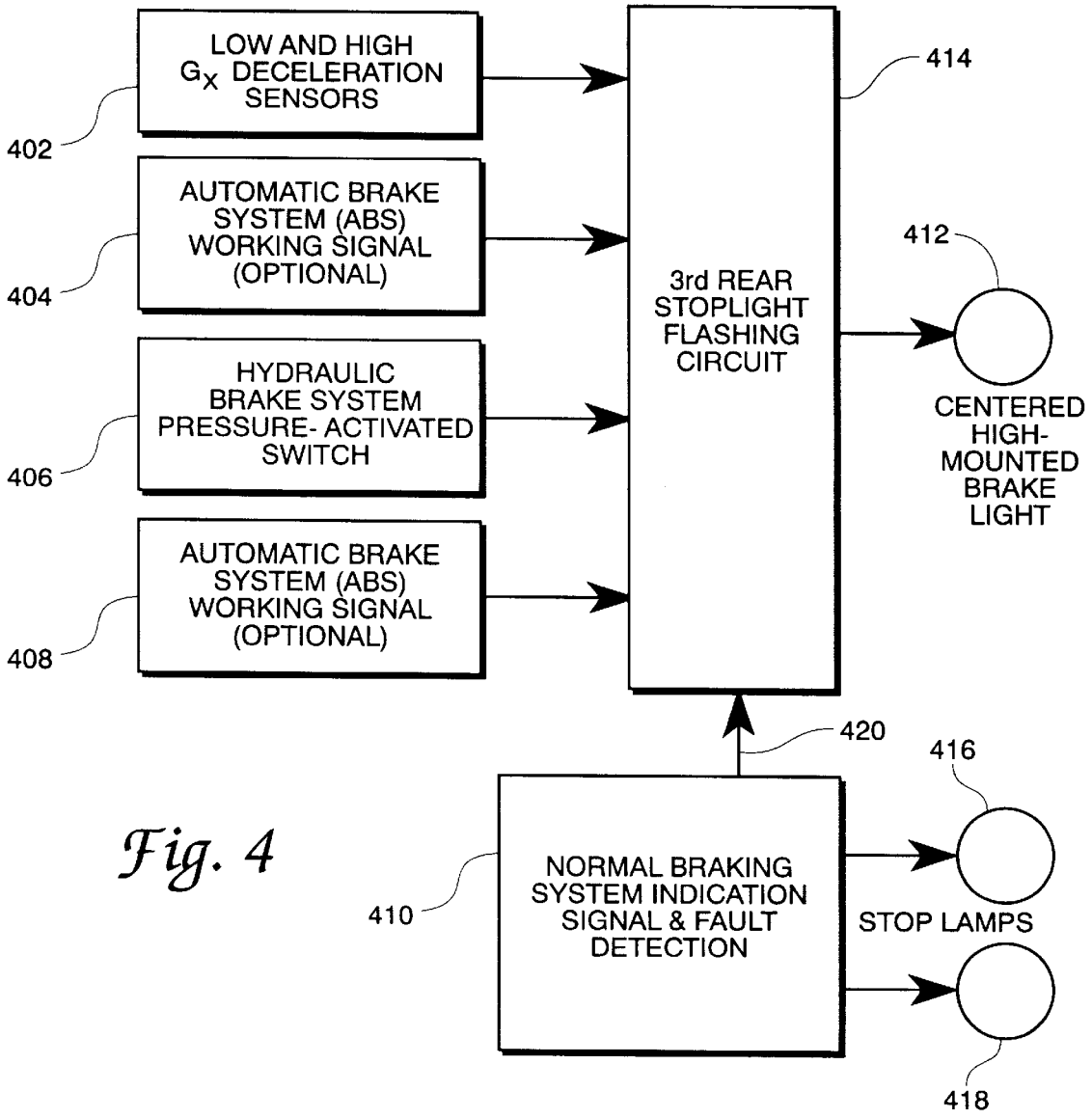
FIG. 4 shows a more detailed block diagram for operating a center high-mounted stoplight system according to the present invention.

In the FIG. 4 drawing a plurality of vehicle sensing devices as represented at 402, 404, 406, 408 and 410 are shown connected to a hardware electrical circuit 414 which controls the center high-mounted stoplight 412. Included in the sensing devices 402, 404, 406, 408 and 410 is the normal braking system indicating apparatus 410 operating the conventional stop lamps 416 and 418, lamps which may be included in the low-mounted left and right tail lamps indicated at 106 and 108 in FIG. 1 and at 208 and 210 in FIG. 2 for example. A brake application signal from this normal braking system indicating apparatus 410 is provided on the path 420 to the hardware electrical circuit 414. Additional braking related signals originate in the low and high $g_x$ deceleration sensors 402, the automatic brake system sensor 404, the hydraulic brake system pressure activated switch 406 and the vehicle motion indicator sensor 408 and are coupled to the hardware electrical circuit 414 via the indicated signal paths. The combination of these different braking related signals into a final energization signal for the center high-mounted stoplight 412 can be accomplished according to a variety of combinational algorithms in the hardware electrical circuit 414.

One arrangement of these algorithms may, for example, involve a g-sensitive transducer at 402 that is preset to activate at about −0.25 g's along the longitudinal axis of the vehicle (−g). Minus 0.25 g's is an estimate of a "hard" deceleration; however, studies may be needed to determine an optimal ($-g_x$) value. It appears possible that the sensor 402 may function optimally during dry pavement conditions. A switch as represented at 406 and sensitive to a preset brake pressure (indicative of a hard deceleration) may also be used to supplement the $g_x$ sensor 402 to detect hard braking on slippery pavement. Condition of the brake system, tire design and pavement conditions will, for example, influence the relationship between signals derived from the sensors 402 and 406 and the actual composite braking effectiveness.

A desirable optional input signal to the flashing system or the hardware electrical circuit 414 may be derived from the automatic brake system (ABS) as is indicated at 404 in FIG. 4. If the vehicle is so equipped, the ABS may be disposed to supply a signal indicating its antilock function is activated and that flashing the center high-mounted stop lamp is probably appropriate. This is actually one of several vehicle element rotation-related signals which may be used in the hardware electrical circuit 414; such signals may also be derived from vehicle drive shaft or individual wheels as suggested by the sensors of block 408 if not already incorporated into the ABS signal from sensor 404.

The flashing circuit or hardware electrical circuit 414 is preferably arranged to flash the center high-mounted stoplight only under extreme stopping conditions, i.e., arranged to reserve the flashing indication for abnormal deceleration conditions. The flashing mode of the center high-mounted stoplight should not be activated when the vehicle is braked normally or even more importantly when the vehicle is routinely stationary. A somewhat special stationary vehicle condition involving the center high-mounted stoplight is discussed below. The needed vehicle motion information to control vehicle stopped flashing can supplied by a sensor from the transmission or other pre-existing speedometer circuit as represented by the sensor block 408 in FIG. 4.

A short hysteresis (or time lag) on the order of one's of seconds may be included in the hardware electrical circuit 414. This lag is one possible accommodation to allow flashing of the center high-mounted stoplight when the operator is pumping the brakes (low-high-low-high, etc., pressure variations) without foot lifting from the pedal (a condition tending to maintain the brake lights on continuously). All the brake lights would flash if the foot is removed entirely from the pedal during pumping. Additionally some present day vehicles (e.g., Toyota) incorporate circuits indicating to the driver that a brake lamp is not functioning and needs replacement. This desirable feature may be integrated with the present invention flashing system to provide a driver warning if, for example, the center high-mounted stoplight 412 is not functioning by reason of lamp or wiring failure or if one of the sensing devices 402, 404, 406, 408 and 410 has failed or in other conditions. Failure sensing arrangements of this type are additionally known in the art by their incorporation into the engine computers of present day vehicles to indicate the abnormal functioning of a throttle position sensor or an engine temperature sensor for examples.

An optional additional safety feature may also be incorporated into the FIG. 4 system. According to this feature, sensing a very high $-g_x$ deceleration value (such as a value in excess of −3.0 g's, as might be encountered in a collision) is to be accomplished. In response to this sensing the hardware electrical circuit 414 is disposed to keep the center high-mounted stoplight flashing continuously and flashing until reset manually. This option provides a warning to others that a collision had occurred and that stopped vehicles are thereby present in the highway. The option also provides an alert to oncoming vehicles to approach with caution and serves as a beacon for summoning help.

Figure 5:
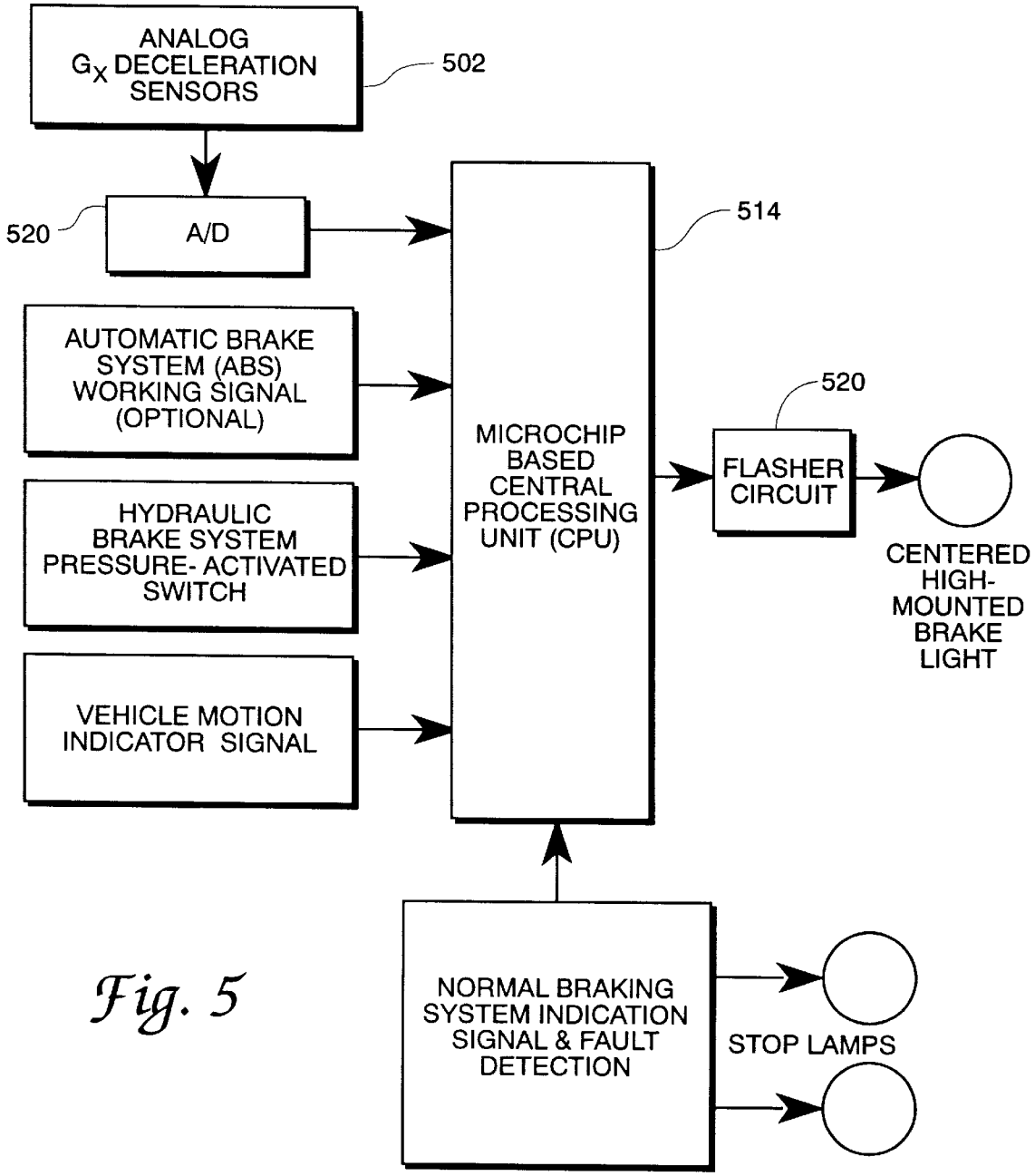
FIG. 5 shows an alternate detailed block diagram for operating a center high-mounted stoplight system according to the present invention.

FIG. 5 in the drawings shows a modification of the FIG. 4 system in the manner needed to utilize analog-sensed information that is continuously monitored and algorithmically evaluated by a microcomputer chip. As may be observed in the FIG. 5 drawing the deceleration sensor at 402 in FIG. 4 is identified to be of an analog sensor type in the corresponding block 502 of FIG. 5, and an analog to digital converter 520 is used to place the resulting signal in a form usable by the central processor 514. The remaining inputs to the central processor 514 are similar to those represented in FIG. 4. In the FIG. 5 system a separate flasher circuit 520 is used between the output of the central processor 514 and the center high-mounted stoplight. This circuit provides current amplification of the low level output of the central processor unit 514 to the several amperes range appropriate for the center high-mounted stoplight.

A significant difference between the discrete component system of FIG. 4 and the central processing unit (CPU)-based system of FIG. 5 lies in the fact that the CPU-based system is continuously calculating the slope and duration of the $-g_x$ profile. A continuous stream of digital data are fed into the CPU to enable analysis of the vehicle's deceleration profiles in real-time. The CPU-based system also looks at the data with a sliding window of time of, for example, five seconds time interval. The continuously calculated slope and duration of the data within this sliding window are analyzed and compared to predetermined values required to be met before the flashing circuit is activated. This CPU-based system is also probably more resistant to false signaling but is more costly to manufacture.

The exact optimized parameters such as $-g_x$ activation thresholds, hydraulic brake pressure, flash rate and hysteresis times needed for an optimum implementation of the present invention center high-mounted stoplight flashing are preferably determined from empirical evaluation studies similar to those performed for the original high centered stoplight of ten years ago. With respect to one such parameter, center high-mounted stoplight flash rate, The Society of Automotive Engineers (SAE) in SAE Standard J595b: 1973 (cited in NBS Special Publication 480-16, 1978, p-93) recommends flash rates of 60–120 flashes/minute (1–2 Hz). SAE Standard J595b, however, relates to flashing rates for vehicular signals in general and does not specifically relate to center high-mounted stoplight signals. These investigations involved the U.S. Department of Transportation, human factors specialists and the auto industry.

The present invention may be provided in modular form as a retrofit kit for older vehicles, especially for government-owned vehicles. A substantial savings to the government or any other user is believed provided by use of the invention; this arises not only in terms of reduced personnel injuries but also from decreased loss of materials and equipment. In a military setting each of these savings contributes to increased readiness. The addition of the center high-mounted stoplight, over ten years ago, is considered a human factors automotive success story; the present invention improvement to this system is believed a meritorious extension of this success.

The following reference documents disclose additional background information regarding the origin of the center high-mounted brake light.

1. Malone, T. B. (1986). The Centered High-Mounted Brake Light: A Human Factors Success Story. HFSB, 29 (10), 1–3.
2. Sheridan, T. B. (1991). Human Factors of Intelligent Vehicle/Highway Systems. HFSB, 34 (5), 11–12.
3. McKnight, A. J. and Shinar, D. (1992). Brake Reaction Time to Center High-Mounted Stop Lamps on Vans and Trucks. HF, 34, 205–214.
4. Howett, G. L. (1978). Emergency Vehicle Warning Lights: State of the Art. NBS Special Publication 480-16.
5. Allen Corporation of America. (1978). Field Validation of Taillight Report on Phase I: Pilot Testing (DOT-HS-7-01756). Alexandria, Va.: U.S. Department of Transportation.
6. Digges, K. H., Nicholson, R. M. and Rouse, E. J. (1985). The Technical Basis for the Center High-Mounted Stop Lamp (S77AE Technical Paper Series 851240). Warrendale, Pa.: Society of Automotive Engineers.
7. Kahane, C. J. (1987). The Effectiveness of Center High-Mounted Stop Lamps: A Preliminary Evaluation (DOT-HS-807-076). Washington, D.C.: U.S. Department of Transportation, National Highway Traffic Safety Administration.
8. Kahane, C. J. (1989). An Evaluation of the Center High-Mounted Stop Lamps Based on 1987 Data (DOT-HS-807-442). Washington, D.C.: U.S. Department of Transportation, National Highway Traffic Safety Administration.
9. Kohl, J. S. and Baker, C. (1978). The Effects of Rear Lighting Systems (DOT-HS-5-01228). Washington, D.C.: U.S. Department of Transportation, National Highway Traffic Safety Administration.
10. McKnight, A. J. and Hilburn, B. G. (1987). The Effects of Rear Warning Light on the Following Distance and Braking Response of Vehicles Behind (performed under contract to the SAFE Foundation, Baldwin, N.Y.) Landover, Md.: National Public Services Research Institute.
11. McKnight, A. J., Shinar, D. and Reizes, A. (1989, May). The Effect of the Center High-Mounted Stop Lamp on Cars and Trucks (DOT-HS-807-506). Washington, D.C.: U.S. Department of Transportation, National Highway Traffic Safety Administration.
12. McKnight, A. J., Tippetts, A. S. and McKnight, A. S. (1988). The Effects of the Center-Mounted Stop Lamp Upon Brake Response Time: 1988. Landover, Md.: National Public Services Research Institute.
13. Mortimer, R. G. (1979). Field Test Evaluation of Rear Lighting Deceleration Signals: I. Analytical and Experimental Studies (DOT-HS-6-01447). Washington, D.C.: U.S. Department of Transportation, National Highway Traffic Safety Administration.
14. Reilly, R. E., Kurke, D. S. and Buckenmaier, C. C. (1980). Validation of the Reduction of Rear-End Collisions by a High-Mounted Auxiliary Stop Lamp (DOT-HS-7-01756). Washington, D.C.: U.S. Department of Transportation, National Highway Traffic Safety Administration.
15. Rockwell, T. H. and Banasik, R. C. (1986). Experimental Highway Testing of Alternative Vehicle Rear Lighting Systems (FH-11-6552). Columbus: Ohio State University.
16. Sivak, M., Post, D. V. and Olson, P. L. (1981). Driver Response to High-Mounted Brake Lights in Actual Traffic. Human Factors, 23, 231–235.
17. U.S. Department of Transportation, National Highway Safety Administration. (1983). Federal Motor Vehicles Safety Standard #108, Center High-Mounted Stop Lamps, Final Regulatory Impact Analysis. Washington, D.C.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. Brake responsive vehicular center high-mounted stoplight apparatus comprising the combination of:

visible light generating electrical energy to optical energy transducer apparatus disposed in rearward facing orientation on a rearward portion of a first vehicle in a center high-mounted and eye-level elevation location with respect to an operator of a trailing second vehicle;

a first vehicle-received source of electrical energy capable of energizing said visible light generating electrical energy to optical energy transducer apparatus;

electrical circuit apparatus connected in electrical energy flow-controlling relationship between said visible light generating electrical energy to optical energy transducer apparatus and said first vehicle-received source of electrical energy;

said electrical circuit apparatus including a first continuously closeable electrical switch element responsive to vehicle braking action in said first vehicle and generating a continuous electrical energy flow in, and a continuous visible signal from, said first vehicle visible light generating electrical energy to optical energy transducer apparatus;

said electrical circuit apparatus including a second periodically opening and closing electrical switch element responsive to selected abnormal intense vehicle braking action in said first vehicle and generating a pulsating electrical energy flow in, and a pulsating visible signal from, said first vehicle visible light generating electrical energy to optical energy transducer apparatus.

2. The brake responsive vehicular center high-mounted stoplight apparatus of claim 1 wherein said periodically opening and closing electrical switch element responsive to selected abnormal intense vehicle braking action is responsive to one of the braking indicia of:

a g-force related rate of deceleration of said first vehicle;

a force per square unit of measure pressure in a pressurized fluid-energized first vehicle braking system element;

a sensed decrease in rate of revolution of a rotating element of said first vehicle;

a rate of force onset transition in a braking system element of said first vehicle;

activation of an anti-lock operating mode in an automatic braking system of said first vehicle.

3. The brake responsive vehicular center high-mounted stoplight apparatus of claim 1 wherein said visible light generating electrical energy to optical energy transducer apparatus includes an incandescent filament lamp.

4. The brake responsive vehicular center high-mounted stoplight apparatus of claim 1 wherein said visible light generating electrical energy to optical energy transducer apparatus includes a plurality of transducer elements disposed in selected physical array on rear portions of said first vehicle.

5. The brake responsive vehicular center high-mounted stoplight apparatus of claim 4 wherein said plurality of transducer elements disposed in selected physical array comprise light-emitting diode elements.

6. The brake responsive vehicular center high-mounted stoplight apparatus of claim 1 wherein said visible light generating electrical energy to optical energy transducer apparatus comprises a captive ionized gas.

7. The brake responsive vehicular center high-mounted stoplight apparatus of claim 1 wherein said first vehicle is one of an automobile, a bus and a truck.

8. The brake responsive vehicular center high-mounted stoplight apparatus of claim 1 wherein said electrical switch elements each comprise one of a mechanically actuated switch element, a semiconductor device and an electrically operated relay switching element.

9. The brake responsive vehicular center high-mounted stoplight apparatus of claim 1 wherein said first continuously closeable electrical switch element comprises a brake element actuated mechanical switch element and said second periodically opening and closing electrical switch element comprises a periodic cycle driven switching element connected in electrical series with said first continuously collapsible electrical switch element.

10. The brake responsive vehicular center high-mounted stoplight apparatus of claim 9 wherein said second periodically opening and closing electrical switch element comprises a periodic cycle driven semiconductor device.

11. The brake responsive vehicular center high-mounted stoplight apparatus of claim 9 wherein said second periodically opening and closing electrical switch element comprises a periodic cycle driven electromagnetic switching device.

12. The method of operating a center high-mounted brake light signal in a motor vehicle, said method comprising the steps of:

energizing said center high-mounted brake light signal with a continuous flow of electrical energy during normal vehicle braking events, events involving braking below a selected threshold of braking intensity;

energizing said center high-mounted brake light signal with a pulsating intermittent flow of electrical energy during abnormal vehicle braking events, events involving braking above said selected threshold of braking intensity;

deenergizing said center high-mounted brake light signal upon termination of each said normal vehicle braking event and said abnormal vehicle braking event.

13. The method of operating a center high-mounted brake light signal of claim 12 further including the step of:

energizing said center high-mounted brake light signal with a pulsating intermittent flow of electrical energy of extended overall time duration in response to a second selected collision-related vehicle deceleration in excess of braking-achievable deceleration.

14. The method of operating a center high-mounted brake light signal of claim 13 further including the step of:

continuing said extended overall time duration pulsating intermittent flow energizing until interrupted by a manually initiated terminating event.

15. The method of operating a center high-mounted brake light signal of claim 13 further including the step of sensing said abnormal vehicle braking event through measurement of one of the parameters of:

a g-force related rate of deceleration of said motor vehicle;

force per squared unit of measure pressure in a pressurized fluid-energized motor vehicle braking system element;

a sensed decrease in rate of revolution of a rotating drive train element of said motor vehicle;

a rate of force onset transition in a braking system element of said motor vehicle.

16. The method of operating a center high-mounted brake light signal of claim 15 wherein said step of sensing said abnormal vehicle braking event includes energizing said brake light signal in response to attained measurements of two of said parameters.

17. Motor vehicle high-mounted visual signaling apparatus comprising the combination of:

a first vehicle-received high-mounted electrically responsive visual signaling device disposed at substantially eye level with respect to an operator's position of a second trailing vehicle;

means for continuously energizing said first vehicle high-mounted electrically responsive visual signaling device from a first vehicle energy source in response to normal deceleration g-force braking of said first vehicle;

means for intermittently energizing said first vehicle high-mounted electrically responsive signaling device from said first vehicle energy source in response to abnormal higher deceleration g-force braking of said first vehicle.

18. The motor vehicle high-mounted visual signaling apparatus of claim 17 wherein:

said first vehicle-received high-mounted electrically responsive visual signaling device includes one of the electrical energy to optical energy transducer elements of an incandescent filament lamp, a captive ionized gas lamp and a light-emitting diode light source;

said means for continuously energizing said first vehicle high-mounted electrically responsive visual signaling device from a first vehicle energy source includes a vehicle brake-responsive electromechanical switch element-incorporated electrical circuit connected intermediate an electrical battery and rectified alternator-energized electrical system of said vehicle and said electrical energy to optical energy transducer element;

said means for intermittently energizing said first vehicle high-mounted electrically responsive signaling device includes one of a periodic cycle driven semiconductor device and a periodic cycle driven electromagnetic switching device; and said periodic cycle driven switching device includes a periodic cycle selected for substantial human visibility and attention capturing with respect to a second vehicle operator.

* * * * *